UNITED STATES PATENT OFFICE.

WOOLSEY McA. JOHNSON, OF HARTFORD, CONNECTICUT.

PROCESS FOR TREATING NICKEL SCRAP AND SLUDGE.

1,299,577.      Specification of Letters Patent.      Patented Apr. 8, 1919.

No Drawing.      Application filed August 3, 1917. Serial No. 184,216.

*To all whom it may concern:*

Be it known that I, WOOLSEY McA. JOHNSON, a citizen of the United States, residing in the city of Hartford and State of Connecticut, have invented certain new and useful Improvements in Processes for Treating Nickel Scrap and Sludge, of which the following is a specification.

My invention relates to the recovery of platiniferous products from the scrap or sludge which remains after the nickel of commerce has been used for any purpose, as for example, in any of the nickel plating processes.

It is well known that the nickel of commerce contains a percentage of combined platinum and palladium. Nickel of commerce from the Sudbury district in Canada is known to contain from one to two ounces per ton of combined platinum and palladium. I have found by analysis that the mass of scrap and sludge obtained from the vat in electrolytic processes of nickel plating contains from three to seven ounces per ton of combined platinum and palladium. I have also found that by screening this mass to obtain the finer particles the percentage of the combined platinum and palladium per ton on analysis has a higher average. In one instance the average was 18.62 ounces per ton. I have also found that by subjecting this finer material to a "differential settling" a further concentration was effected and a product analyzing 77.70 ounces per ton of combined platinum and palladium was obtained.

In carrying out my process I accordingly take ordinary nickel scrap and subject it to screening, washing, or other process to obtain a separation of the fines. The screening or other separating process used may advantageously be adapted to first separate the particles which would pass through a 20 to 30 mesh screen. And after the first separating process just mentioned, the portion which has passed through a screen or been otherwise separated as fines is advantageously subjected to differential settling so as to effect a further classification of the particles. The top layers may be drawn off and filtered to form a cake. The lower layers are also drawn off and decanted.

As far as I have carried my process I obtain three products: (1) coarse scrap (the product of the screening or similar first classification process) which analyzes about one ounce per ton of combined platinum and palladium; (2) heavy sludge (the decanted product of the differential settling) which analysis shows about 8 ounces per ton of combined platinum and palladium; and (3) fine slime the product obtained from filtering the top layers of the differential settling which analysis shows about 80 ounces per ton of combined platinum and palladium.

I have found that the quantity of the three products above enumerated will vary according to the character of the scrap, which variations are produced by reason of the character of the anode used in electroplating, the conditions of electrolysis, etc., but they will average respectively 55%, 41% and 4% of the original mass. In view of the variations just mentioned, the point at which it is desirable to determine the differential settling process can conveniently be determined by analysis of a sample of the particular scrap used and subjected to the process.

The three products above enumerated are further treated as follows:

(*a*) The coarse scrap is subjected to an electrolytic process mainly for the purpose of obtaining the nickel which is dissolved and deposited. Preferably the process recommended by Thum may be used. The residue may be used for further treatment by the process outlined herein.

(*b*) The heavy sludge is treated with sulfuric acid for the production of nickel salts and a residue is obtained which analysis shows contains about 200 ounces per ton of combined platinum and palladium.

(*c*) The fine slime is also treated with sulfuric acid and the residue, as well as the residue which was obtained from the sulfuric treatment of the heavy sludge, is treated with aqua regia to form a solution which analysis shows is very high in combined platinum and palladium.

The solution with the aqua regia now contains little impurity except iridium, osmium, etc., and may be treated in any conventional manner for the production of refined platinum and palladium.

Instead of the treatment above shown the three products, after the first treatment of the raw material by screening and differential settling may be treated by a purely fire treatment or by a combination of pyrometallurgical, electrometallurgical or hydrometallurgical processes to recover the platinum and palladium.

In the event that a purely fire treatment is used the coarse scrap is smelted in a cupola or electric furnace and nickel is produced. The heavy sludge is scorified and cupeled and the fine slime is also cupeled and a product is obtained which analysis has shown contains about 11,000 ounces per ton of combined platinum and palladium. This product is dissolved, the solution purified and the metals precipitated by any of the processes well known in the art.

While this process has the specific purpose of utilizing the waste material from nickel platers' establishments, it can also be used in the treatment of similar materials from any other plants in which commercial nickel ore is used and from which a scrap or sludge is obtained. My invention is based upon the discovery that the values of the precious metals in the residues resulting from the electrolytic dissolution of a soluble nickel anode are in an extraordinary fine and minute state of subdivision.

What I claim as my invention is:

1. The process of treating the residue obtained from the electrolysis of commercial nickel to obtain material comparatively rich in platinum content which comprises subjecting said residue to a suitable separation process to classify it into coarse and fine particles and subjecting the fine particles to a further settling treatment to classify it into heavy sludge and fine slimes and recovering the fine slimes which are comparatively rich in platinum content.

2. The process of treating the residue obtained from the electrolysis of commercial nickel to obtain material comparatively rich in platinum content which comprises subjecting said residue to a suitable separation process to classify it into coarse and fine particles and subjecting the fine particles to a further settling treatment to classify it into heavy sludge and fine slimes, subjecting the heavy sludge to an acid treatment to remove the nickel salts and to obtain a residue rich in platinum content, and subjecting the fine slimes and the residue last mentioned to a chemical treatment to obtain a solution rich in platinum.

3. The process of treating the residue obtained from the electrolysis of commercial nickel to obtain material comparatively rich in platinum content which comprises subjecting said residue to a suitable separation process to classify it into coarse and fine particles and subjecting the fine particles to a further settling treatment to classify it into heavy sludge and fine slimes, and subjecting the three classes of material respectively to chemical treatment to obtain platiniferous products.

WOOLSEY McA. JOHNSON.

Copies of this patent may be obtained for five cents each, by addressing the "Commissioner of Patents, Washington, D. C."